US006135157A

United States Patent [19]
Conklin, III

[11] Patent Number: 6,135,157
[45] Date of Patent: Oct. 24, 2000

[54] METHOD OF FILLING THE INTERIOR OF PIPES

[76] Inventor: Ira D. Conklin, III, 94 Stewart Ave., Newburg, N.Y. 12550

[21] Appl. No.: 09/358,527

[22] Filed: Jul. 22, 1999

[51] Int. Cl.[7] .............................. F16L 55/10; F16L 55/16
[52] U.S. Cl. ................................. 138/89; 138/98
[58] Field of Search ................................. 138/89, 97, 98

[56] References Cited

U.S. PATENT DOCUMENTS

| | | | |
|---|---|---|---|
| 4,073,841 | 2/1978 | Dultgen et al. | 264/46.6 |
| 4,440,194 | 4/1984 | Kunumoto et al. | 138/89 |
| 4,554,178 | 11/1985 | Yamamoto et al. | 427/140 |
| 5,213,120 | 5/1993 | Dickson | 134/102.1 |
| 5,586,580 | 12/1996 | Fisk et al. | 138/98 |
| 5,622,209 | 4/1997 | Naf | 138/97 |
| 5,628,345 | 5/1997 | Fisco | 138/97 |

Primary Examiner—Andres Kashnikow
Assistant Examiner—Davis Hwu

[57] ABSTRACT

A process of filling an underground natural gas pipeline and similar pipelines with an inert foam to render the pipeline unusable. Pipelines which are no longer in service must be properly be abandoned in a manner acceptable to the United States Environmental Protection Agency. The pipeline is cut at periodic intervals to create a shorter pipe and small sections of pipe are removed. An electrical or plumber's snake or similar device is passed through the pipe between the cuts to ensure that a clear path exists. A dual hose is then pulled through the pipe from a first opening to a second opening and a mixing device having a mixing head and a static mixing tube is then attached to the hoses. The chemicals needed to produce the foam are then pumped through the hoses. The hoses are then pulled back to the first opening as the mixed chemicals are pumped through the mixing head. The mixed chemicals react with each other to create an inert foam. Sufficient chemicals are pumped into the pipeline and reacted to fill the pipeline to more than 50% of the pipeline volume with the inert foam to a density of about 2 pounds per cubic foot.

1 Claim, 5 Drawing Sheets

METHOD OF FILLING THE INTERIOR OF PIPES

FIELD OF THE INVENTION

This invention relates a method of internally filling pipes to allow the pipes to be abandoned in compliance with environmental regulations by using inert foams.

DESCRIPTION OF THE RELATED ART

The method of sealing fine cracks and cavities in a pipe or a pipeline and at the same time internally coating the pipeline with a foamed sealant is already known and is used when leakage has occurred or is likely to occur in pipelines, particularly those for distributing gas such as fuel gas. The known methods generally comprise the steps of supplying and filling a pipeline with a foamed sealant of the aqueous emulsion type whereby the sealant penetrates the leaking point, passing air through the pipeline to discharge an excess amount of the sealant, the rest of the sealant remaining in tubular form extending axially of the pipeline and adhering to the interior wall thereof, and finally allowing the residual, tubular sealant to cure.

There are no methods of filling a pipe or a pipeline with an inert foam for the purpose of rendering it unusable.

SUMMARY OF THE INVENTION

The present invention provides a process of filling the interior of an underground natural gas pipe and similar pipes with a foam to render the pipe unusable for service as a pipeline. Pipelines which are no longer in service must be properly be abandoned in a manner acceptable to the United States Environmental Protection Agency. The pipe is cut at periodic intervals of not more than 300 feet and small sections of pipe are removed. An electrical snake or a plumbing snake or similar device is passed through the pipe between the cuts to ensure that a clear path exists. At least two hoses are then pulled through the pipeline from a first opening to a second opening. A mixing head having a static mixing tube is then attached to the hoses. The chemicals needed to produce the foam are then pumped through the hoses. The hoses are then pulled back in the direction of the first opening as the mixed chemicals are pumped through the mixing head. The mixed chemicals react with each other to create an inert foam. Sufficient chemicals are pumped into the pipeline and reacted to fill the pipeline to more than 50% of the pipeline volume with the inert foam to a density of about 2 pounds per cubic foot.

Prior art does not provide any methods of internally filling pipes and pipelines with inert foams that are non-chlorofluorocarbon containing polyurethane foams.

DETAILED DESCRIPTION OF THE PREFERRED EMBODIMENT

The invention is a method of internally filling a section of pipe in a pipeline comprising the steps of: disconnecting or cutting the pipeline at two different locations to create a smaller section of pipe, establishing that a clear path exists between both ends of the pipe, filling said pipe with mixed chemicals and allowing said chemicals to cure wherein an inert foam is formed and fills the interior of the pipe. The preferred method uses an inert foam which is a polyurethane foam. The most preferred method uses a non-chlorofluorocarbon containing polyurethane foam.

A process of filling an underground natural gas pipeline and similar pipelines with a foam to render the pipeline unusable. Pipelines which are no longer in service must be properly be abandoned in a manner acceptable to the United States Environmental Protection Agency. The pipeline is cut at periodic intervals to create short pipes and small sections of the pipe are removed. An electrical snake or a plumbing snake or similar device is passed through the pipeline between the cuts to ensure that a clear path exists. A mixing device having a mixing head with a flow back preventer and a static mixing tube is then attached to hoses which are then pulled through the pipeline from a first opening to a second opening. The chemicals needed to produce the foam are then pumped through the hoses. The hoses are then pulled back to the first opening as the mixed chemicals are pumped through the mixing head and the static mixing nozzle. The mixed chemicals react with each other to create an inert foam. Sufficient chemicals are pumped into the pipeline and reacted to fill the pipeline to more than 50% of the pipeline volume with the inert foam to a density of about 2 pounds per cubic foot.

Referring now to the detailed drawings there is illustrated a method in accordance with the present invention which demonstrates the preferred embodiment of the present invention, wherein like referenced numerals refer to like elements throughout the drawings.

Figure 1:
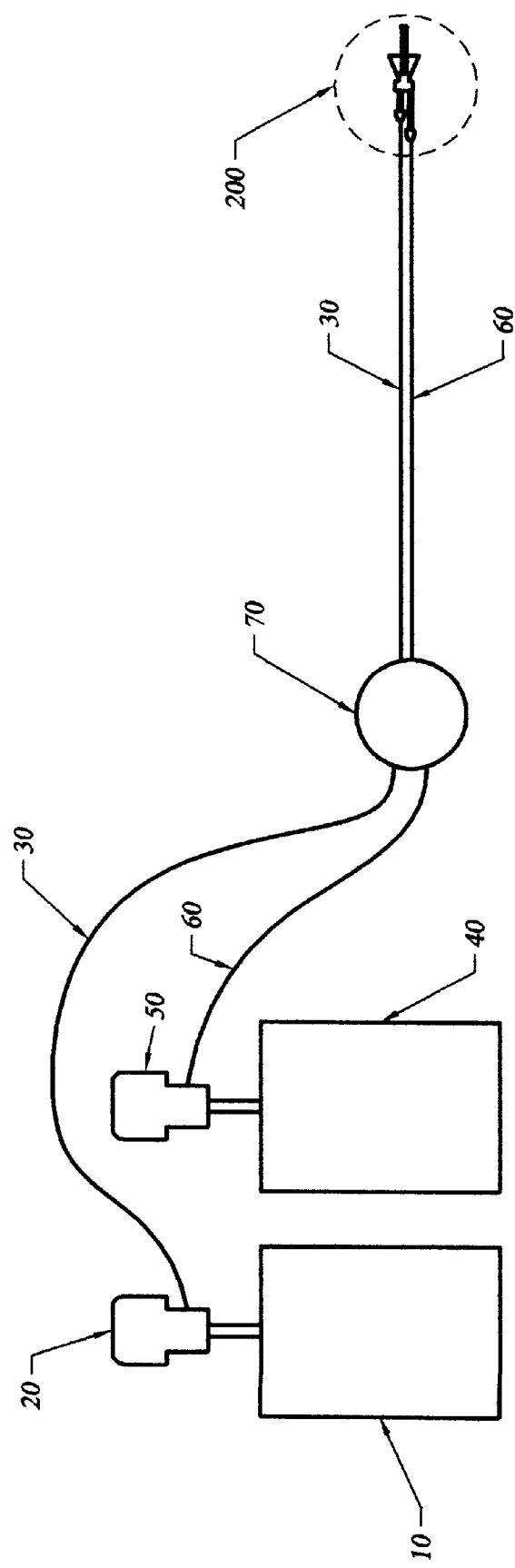
FIG. 1 is an explanatory view illustrating a typical equipment layout for use in implementing the method, according to the present invention.

As shown in FIG. 1, pumping devices 20, 50 are attached to chemical containers 10, 40. Hoses 30, 60 are then attached to the pumping devices 20, 50 respectively. The hoses are then attached to a mixing device 200. Operation of the pumping devices 20, 50 results in the chemicals from the chemical containers 10, 40 to be pumped through the hoses 30, 60 to the mixing device 200. In the preferred embodiment, a hose reel 70 is used to hold long sections of the hoses 30, 60.

Figure 2:
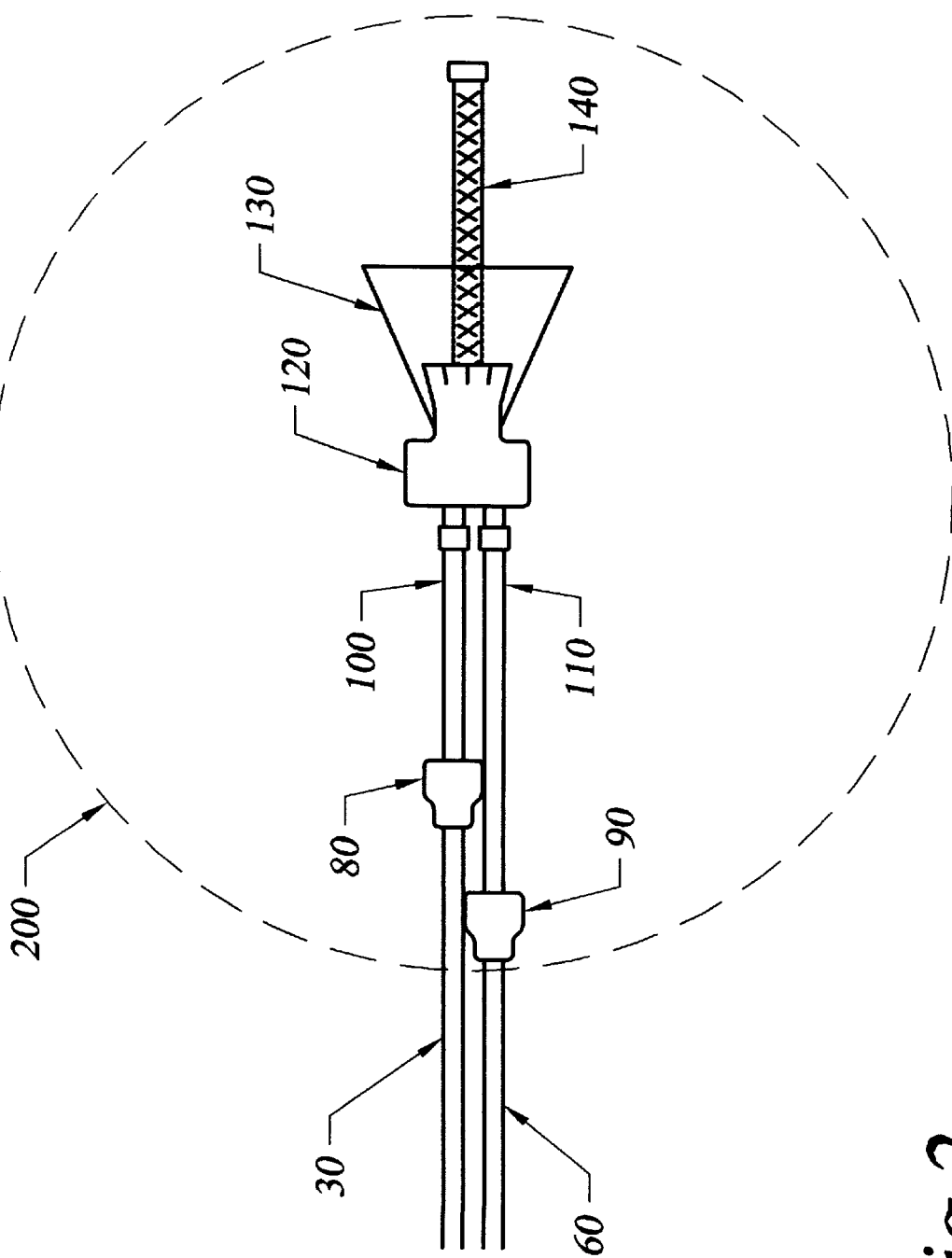
FIG. 2 is an elevation view illustrating a mixing device used in the method of filling the interior of pipes according to the present invention.

FIG. 2 is an elevation view illustrating the mixing device 200 used in the method of filling the interior of pipes according to the present invention. In the preferred embodiment, the mixing device 200 comprises a mixing head 120, a back flow preventer 130, and a static mixing tube 140. The hoses 30, 60 are typically attached to the back part of the mixing head 120 using quick connect couplings 80, 90 and pipe nipples 100, 110.

Figure 3:
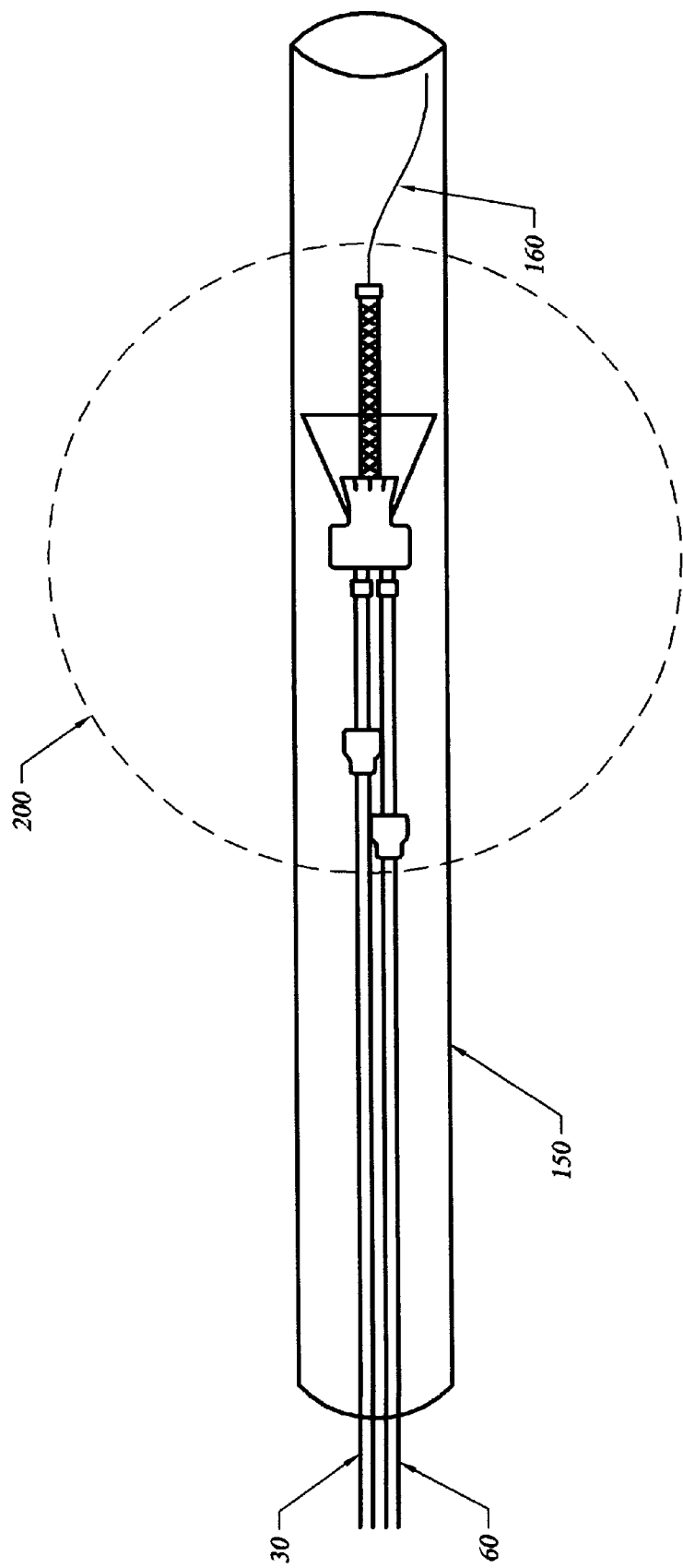
FIG. 3 is an explanatory view illustrating the mixing device of FIG. 2 inserted into a pipe according to the present invention.

As shown in FIG. 3, the mixing device 200 is inserted into a pipe 150 to be filled using the method of the present invention. Prior to inserting the mixing device 200 into a pipe, a clear path from a first opening to a second opening is established according to the method of the present invention. A clear path is typically established by inserting an electrical snake or a plumber's snake or similar device into the pipe 150 and pushing it from a first opening to a second opening. The mixing device 200 is then attached to the snake or similar device and is pulled through the pipe 150 to the first opening. The chemicals are then pumped through the hoses 30, 60 and further through the mixing device 200 wherein the chemicals are mixed and a foam stream 160 is discharged into the interior of the pipe 150.

Figure 4:
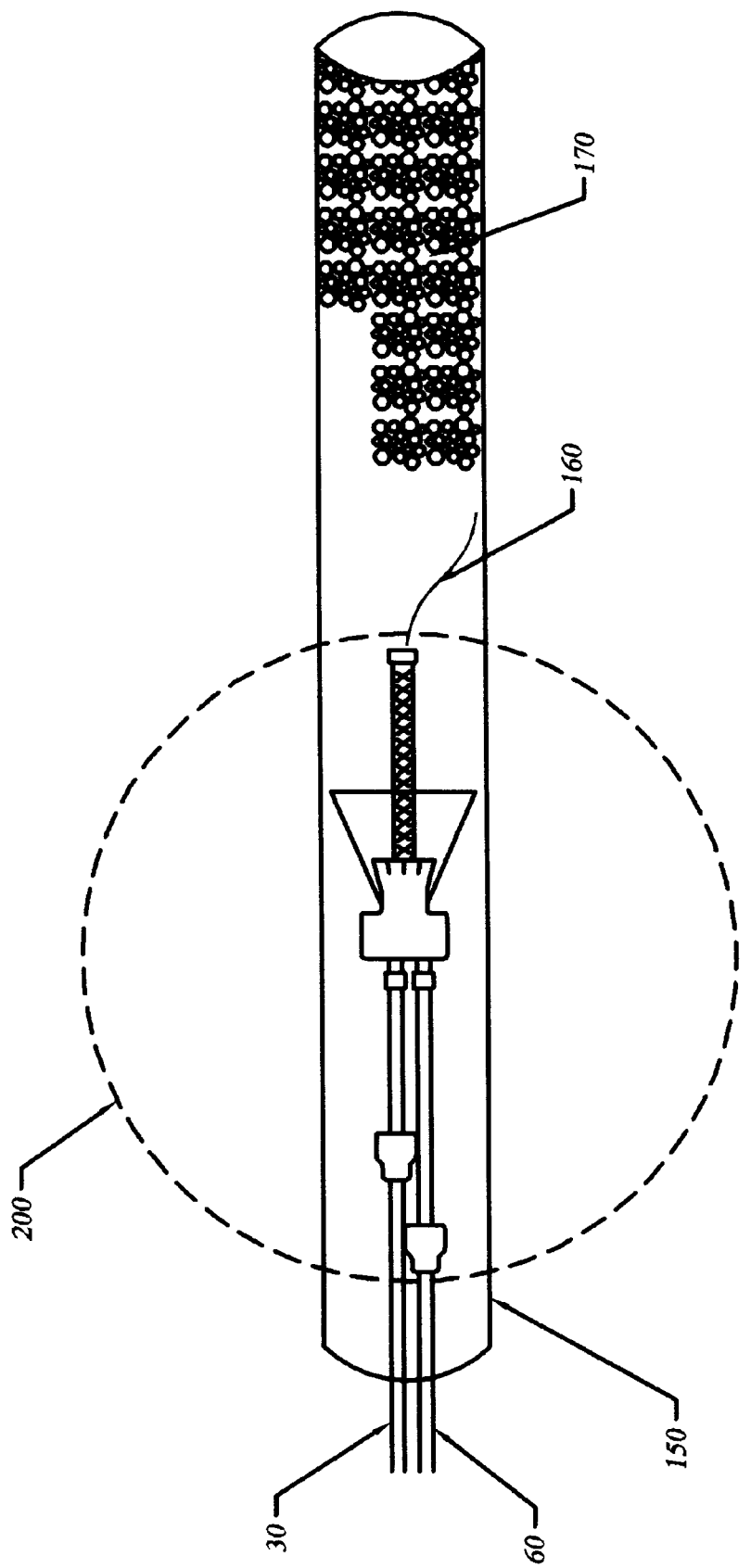
FIG. 4 is an explanatory view illustrating the method of filling the interior of an existing pipe according to the present invention.

As further shown in FIG. 4, according to the method of the present invention, the foam stream 160 from the mixing device 200 reacts and cures to form an inert foam 170 with a density of about 2 pounds per cubic foot in the interior of the pipe 150. Sufficient chemicals are pumped through the mixing device 200 to result in the inert foam 170 filling the interior of the pipe 150 to more than 50%. As the chemicals are pumped through the mixing device 200 and the foam stream 160 is discharged from the mixing device 200, the mixing device is pulled through the pipe 150 to the second opening. The movement of the mixing head is adjusted to provide about 100% fill of the interior of the pipe 150 at the ends of the pipe 150 and at least 50% throughout the interior of the pipe 150.

Figure 5:
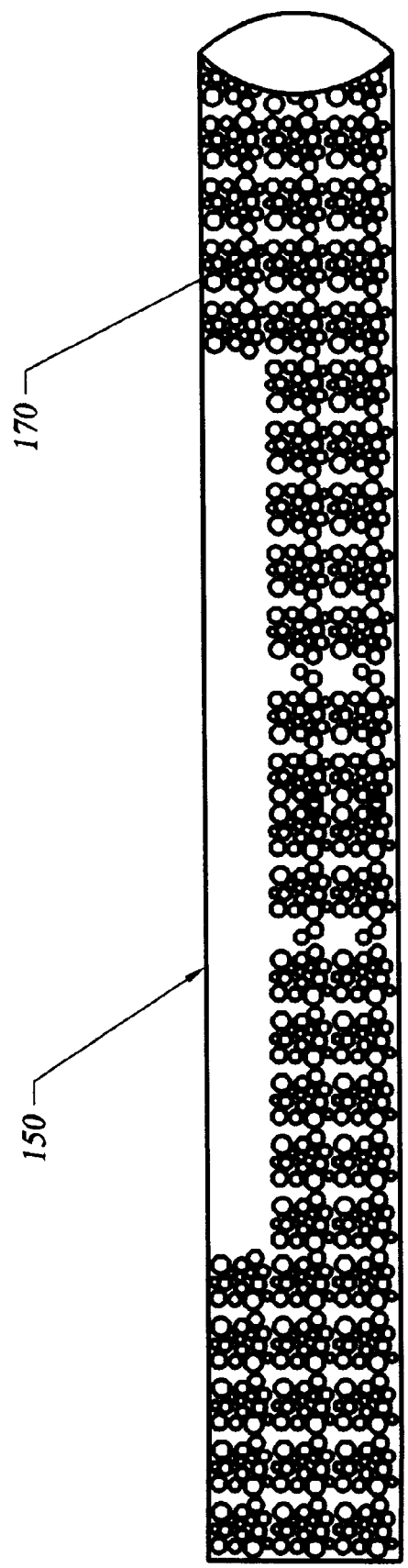
FIG. 5 is an explanatory view illustrating the interior of a typical pipe after it has been filled with a foam according to the present invention.

As still further illustrated in FIG. 5, the inert foam 170 fills the interior of the pipe 150 from about 100% at the ends of the pipe 150 to at least 50% throughout the rest of the pipe 150.

The preferred embodiments of the present invention disclosed herein have been discussed for the purpose of familiarizing the reader with the novel aspects of the invention. Although preferred embodiments of this invention have been shown, many changes, modifications, and substitutions may be made by one having ordinary skill in the art without departing from the scope and spirit of the invention as described in the following claims.

What is claimed is:

1. A method of filling at least 50% of the interior of a disconnected or cut pipe, said method comprising the steps of:

(disconnecting or cutting the pipe at two different locations,)

inserting and pulling or pushing an electrical or plumbing snake or similar device through the pipe between the cuts to ensure that a clear path exists, pulling a mixing device through the pipe, whereby said mixing head is attached to two or more hoses, injecting into the pipe at least two chemicals through the mixing device, whereby the chemicals are pumped to said mixing device through said two or more hoses, whereby further said mixing device mixes the at least two chemicals, and allowing the at least two chemicals to react and cure wherein an inert foam is formed and fills (at least 50% of) the interior of the pipe to render the pipe unusable.

\* \* \* \* \*